United States Patent [19]

Schäfer

[11] 4,279,215
[45] Jul. 21, 1981

[54] APPARATUS FOR SPRAYING WORKPIECES AND INTERCEPTING OVERSPRAY

[75] Inventor: Gerhard Schäfer, Neunkirchen, Fed. Rep. of Germany

[73] Assignee: Fritz Schäfer GmbH, Neunkirchen-Salchendorf, Fed. Rep. of Germany

[21] Appl. No.: 43,846

[22] Filed: May 30, 1979

[30] Foreign Application Priority Data

Jun. 1, 1978 [DE] Fed. Rep. of Germany ....... 2823958

[51] Int. Cl.³ .............................................. B05B 1/28
[52] U.S. Cl. .................................... 118/326; 118/501; 427/345; 427/421; 427/424
[58] Field of Search ................. 118/70, 300, 326, 501, 118/504; 427/345, 424, 421

[56] References Cited

U.S. PATENT DOCUMENTS

| | | | |
|---|---|---|---|
| 2,183,474 | 12/1939 | Burgmer | 118/70 |
| 2,733,172 | 1/1956 | Brennan | 427/424 |
| 2,854,946 | 10/1958 | Norris | 118/326 X |
| 3,450,095 | 6/1969 | Greiner | 118/70 X |
| 3,633,536 | 1/1972 | Morrison | 118/70 X |
| 3,902,455 | 9/1975 | Lehmann et al. | 118/326 |
| 4,156,041 | 5/1979 | Gilbert | 427/424 X |

Primary Examiner—Shrive P. Beck
Attorney, Agent, or Firm—Karl F. Ross

[57] ABSTRACT

A spray booth provided with a horizontally oriented nozzle for the surface-coating (e.g. coloring) of suspended workpieces passing by on a conveyor is provided with an upright screen intercepting excess coating material. The screen is a disk or an endless band driven continuously at slow speed to accumulate the excess fluid in a coherent film which is stripped off by a stationary wiper for immediate or delayed reuse.

9 Claims, 5 Drawing Figures

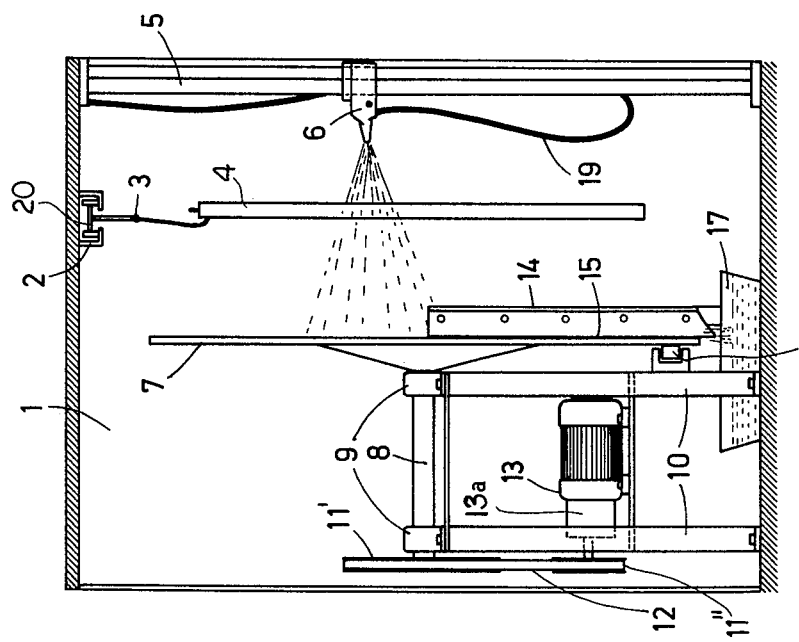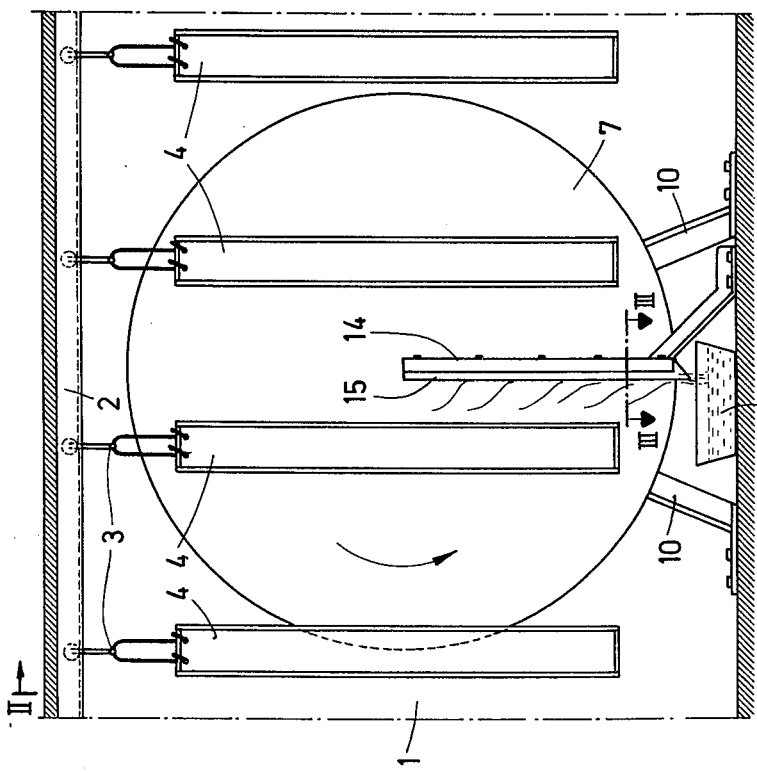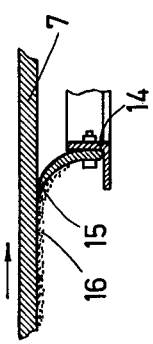

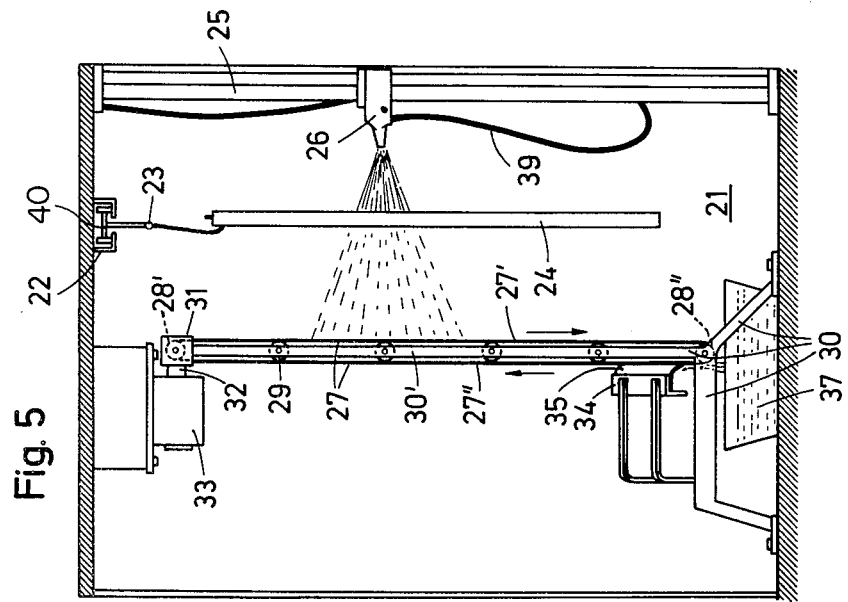
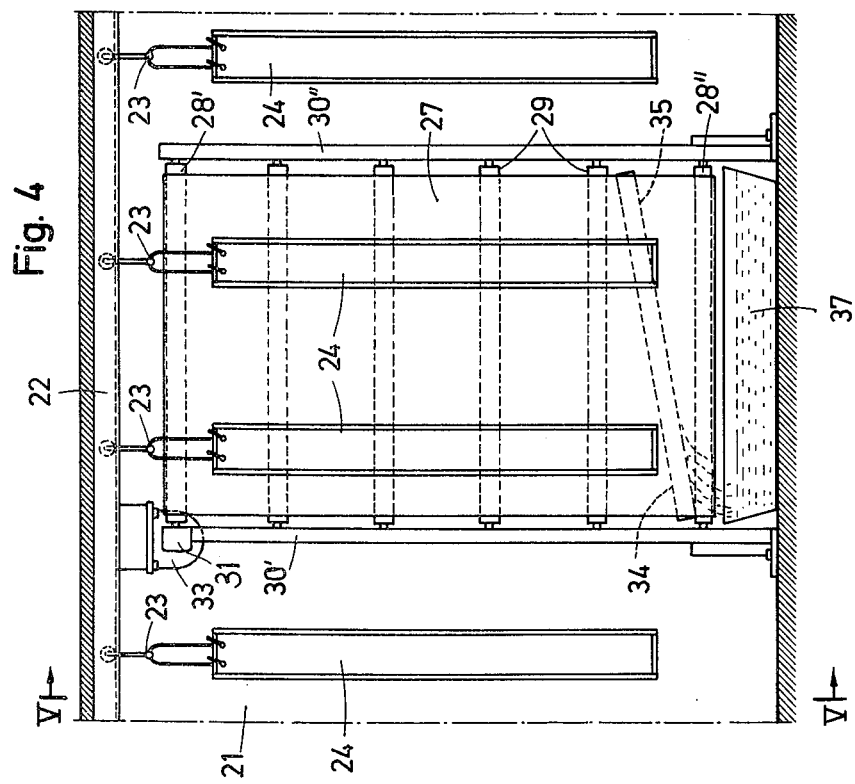

APPARATUS FOR SPRAYING WORKPIECES AND INTERCEPTING OVERSPRAY

FIELD OF THE INVENTION

My present invention relates to a method of and an apparatus for coloring or otherwise surface-coating a series of workpieces with the aid of one or more nozzles emitting a spray of a hardenable treatment liquid, e.g. a lacquer.

BACKGROUND OF THE INVENTION

When a generally conical spray is directed upon a workpiece surface to be coated, part of the treatment fluid unavoidably bypasses the workpiece and drops to the ground or strikes a wall of a surrounding spray booth in the absence of special precautions. Since the progressive accumulation of the hardened coating material on a floor or wall surface is undesirable, it has been proposed to establish a water curtain in the path of a generally horizontal spray, beyond the workpiece to be treated, to intercept the liquid particles bypassing the workpiece in order to remove them from the booth. A drawback of this method, however, is the fact that the intercepted excess treatment agent is wasted; it also becomes necessary to decontaminate the effluent water before allowing it to be further utilized or to be drained into a sewer.

OBJECTS OF THE INVENTION

An important object of my present invention, therefore, is to provide a method of surface-coating such workpieces with avoidance of the aforestated inconveniences, enabling immediate or delayed reuse of excess treatment material.

A related object is to provide a simple apparatus for carrying out this method.

SUMMARY OF THE INVENTION

In accordance with my present invention, the excess liquid bypassing a workpiece is intercepted on a surface of a solid screen positioned on the side of that workpiece remote from the origin of the spray, i.e. from the emitting nozzle or nozzles. The screen is being continuously moved, at a speed low enough to allow the formation of a coherent film by the intercepted liquid, the film being continuously stripped off the moving screen. This removal is carried out by a preferably stationary wiper overlying a receptacle which receives the removed liquid, the wiper being advantageously provided with one or more resilient scraper lips or blades of rubber or the like contacting the screen along practically its entire working surface in the course of a cycle of oscillatory or, preferably, rotatory displacement of the screen by suitable drive means.

It will generally be convenient to design the screen as a unidirectionally rotating member with a substantially vertical front surface perpendicular to the spray axis. Such a member may be a disk, rotatable about an axis substantially paralleling that of the spray cone, or an endless band led about a pair of deflecting rollers. In the latter instance the excess liquid, intercepted on a front run of the band, is advantageously wiped off on a rear run remote from the spray nozzle or nozzles.

BRIEF DESCRIPTION OF THE DRAWING

The above and other features of my invention will now be described in detail with reference to the accompanying drawing in which:

FIG. 1 is a vertical section through a spray booth, showing in elevational view a device according to my invention for the removal of excess treatment fluid from the booth;

FIG. 2 is a cross-sectional view taken on the line II—II of FIG. 1 and showing the fluid-removal device in side elevation;

FIG. 3 is a sectional detail view taken on the line III—III of FIG. 1;

FIG. 4 is a view similar to FIG. 1, illustrating another embodiment; and

FIG. 5 is a sectional view similar to FIG. 2 but taken on the line V—V of FIG. 4.

SPECIFIC DESCRIPTION

In FIGS. 1 and 2 I have shown a spray booth 1 whose ceiling carries a guide rail 2 for a conveyor chain 20 provided with hooks 3 for the suspension of a multiplicity of elongate workpieces 4 to be sprayed. These workpieces pass successively in front of a nozzle 6 emitting a cone of liquid treatment agent, e.g. a lacquer, toward a screen 7 which intercepts the excess fluid inevitably bypassing the workpieces. The nozzle 6 is mounted on a column 5 for vertical reciprocation, under the control of a nonillustrated drive mechanism, in order to spray each passing workpiece over its full length.

The screen 7 is a vertical disk cantilevered on a horizontal shaft 8 which is journaled in bearings 9 on a stand 10. Shaft 8 is driven by a V-belt 12 from an electric motor 13, also supported on stand 10, via a pair of pulleys 11', 11". A reduction gearing 13a coupled with motor 13 causes the disk to rotate at a speed low enough to let the impinging liquid form a continuous film 16 (FIG. 3) on its surface confronting the nozzle 6. That surface is continuously cleaned by a stationary wiper 14 provided with a flexible scraper blade or lip 15 which extends along a vertical disk radius and approaches the surface of the disk in a direction opposite its sense of rotation, assumed to be counterclockwise in FIG. 1. The accumulated film 16 is vertically guided along the upstanding lip 15 into a receptacle 17 from which it may be returned, continuously or intermittently, to a tank supplying the nozzle 6 via a nonillustrated pump and a conduit 19. Wiper 14 and lip 15 terminate near the axis of rotation of disk 7, just below the spray cone.

In order to insure full-face contact between the scraper lip 15 and the disk surface, disk 7 is backed by a bracing roller 18 which bears upon its rear surface near the lower end of its vertical diameter aligned with that lip.

FIGS. 4 and 5 show a similar spray booth 21 with guide rail 22, conveyor chain 40, suspension hooks 23 for a set of workpieces 24, and a column 25 supporting a vertically reciprocable nozzle 26 which is provided with a supply tube 39 extending from a nonillustrated pump and reservoir as in the preceding embodiment. A screen 27 is here constituted by an endless band with a descending run 27' confronting the nozzle 26 and an ascending run 27" averted from that nozzle. The band 27 is led around two deflecting rollers 28' and 28", the upper roller 28' being driven by an overhead motor 33. Intermediate spacing rollers 29 are supported, together with deflecting rollers 28' and 28", on a pair of stationary stringers 30' and 30" forming part of a frame 30.

The shaft 32 of motor 33 is connected with the upper deflecting roller 28' through a speed reducer 31 again insuring that excess fluid accumulating on the front side of screen 27—i.e. on the run 27'—forms a continuous film. In this instance, however, the screen is cleaned on its reverse side by a wiper 34 extending inclinedly thereacross; practically its entire front surface is therefore available for interception purposes. Wiper 34 has a downwardly facing scraper blade or lip 35 of rubber or the like whose lower edge facing the rising band removes the adhering liquid and lets it drip into an underlying receptacle 37 which also catches any drops that may detach themselves from the screen as it moves around the lower roller 28". Receptacle 37 may again empty into the reservoir feeding the supply conduit 39 of nozzle 26.

If the liquid stripped off the screen surface by wiper 14 or 34 is a fast-hardening thermoplastic resin or the like, it may have to be reheated or redissolved before being removed from vessel 17 or 37 for subsequent reuse.

Since the intercepted liquid cannot reach the inner band surface contacting the deflecting and spacing rollers 28', 28" and 29, these rollers are protected against contamination by that liquid.

I claim:

1. An apparatus for the surface-coating of a series of workpieces with a hardenable liquid, comprising:
   a booth;
   nozzle means in said booth connected to a source of coating liquid and adapted to discharge same in a spray cone centered on a substantially horizontal axis;
   conveyor means in said booth for transporting a series of generally vertical workpieces along a predetermined path past said nozzle means across said spray cone;
   a disk with a substantially vertical front surface facing said nozzle means at a location in said booth behind the path of said workpieces, said front surface being large enough to intercept any excess liquid in said spray cone bypassing the workpieces to be coated;
   drive means coupled with said disk for unidirectionally rotating same about an axis substantially parallel to the cone axis and at a rate slow enough to allow the intercepted liquid to form a coherent film of coating material on said front surface;
   wiper means in contact with said surface at a location offset from said spray cone for continuously stripping off said film during operation of said drive means; and
   a receptacle below said wiper means for receiving the coating material removed by said wiper means from said disk.

2. An apparatus as defined in claim 1 wherein said wiper means is stationary and comprises a resilient scraper lip facing against the direction of disk rotation and contacting said front surface along a generally radial line.

3. An apparatus as defined in claim 2 wherein said line extends substantially vertically down from the center of said disk to the periphery thereof.

4. An apparatus as defined in claim 2 or 3 wherein said disk is cantilevered on a horizontal shaft coupled with said drive means, further comprising bracing means bearing upon a rear surface of said disk along said line near the lower end thereof.

5. An apparatus for the surface-coating of a series of workpieces with a hardenable liquid, comprising:
   a booth;
   nozzle means in said booth connected to a source of coating liquid and adapted to discharge same in a spray cone centered on a substantially horizontal axis;
   conveyor means in said booth for transporting a series of generally vertical workpieces along a predetermined path past said nozzle means across said spray cone;
   an endless band led about a pair of vertically separated deflecting rollers at a location in said booth behind the path of said workpiece, said band being provided with a substantially vertical front run facing said nozzle means and an adjacent rear run averted from said nozzle means, said front run being large enough to intercept any excess liquid in said spray cone bypassing the workpieces to be coated while preventing the intercepted liquid from contaminating said deflecting rollers;
   drive means coupled with at least one of said rollers for unidirectionally rotating said band at a rate slow enough to allow the intercepted liquid to form a coherent film of coating material on the surface of said band;
   wiper means in contact with said rear run for continuously stripping off said film from said surface during operation of said drive means; and
   a receptacle below said wiper means for receiving the coating material removed by said wiper means from said band.

6. An apparatus as defined in claim 5 wherein said wiper means is stationary and comprises a resilient scraper lip contacting said band along a line extending obliquely across said rear run.

7. An apparatus as defined in claim 6 wherein said runs move vertically with said rear run ascending and said lip facing downward.

8. An apparatus as defined in claim 5, 6 or 7, further comprising additional roller means separating said runs between said deflecting rollers.

9. An apparatus as defined in claim 5, 6 or 7, further comprising movable support means for said nozzle means enabling same to be vertically reciprocated substantially over the length of said band.

* * * * *